Aug. 15, 1933.   K. STROBEL   1,922,559
ROCK DRILL
Filed May 7, 1932

Inventor
Karl Strobel
By Lyon&Lyon
Attorneys

Patented Aug. 15, 1933

1,922,559

UNITED STATES PATENT OFFICE 1,922,559

ROCK DRILL

Karl Strobel, Whittier, Calif., assignor to Karl Strobel Corporation, Puente, Calif., a Corporation of California Application May 7, 1932. Serial No. 609,894

5 Claims. (Cl. 255—64)

My invention relates to drills, and has particular reference to drills of the character used for boring rock, and similar substances.

In the art of drilling rock, concrete, and the like, it is the practice to employ a drill in the form of an elongated bar of suitable material, such as steel, one end of which is formed with a cutting edge lying transversely to the major axis of the drill stem. However, the cutting edges of such drills rapidly become dull and require cessation of operations in order to permit them to be sharpened. Also, the usual practice is to operate such drills by application of hammer blows upon the opposite end of the drill stem, either by manually striking the end of the drill or by connecting the drill stem in a power driven vibrating hammer construction. The metal forming the cutting end of the drill rapidly crystallizes under the blows and becomes very brittle, causing the cutting edges of the drill to be chipped off, destroying the usefulness of the drill.

It is, therefore, an object of my invention to provide a drill for rock, and the like, which includes a relatively soft metal stem and a separable hard metal head attached to the stem.

Another object of my invention is to provide a drill of the character described in which the cutting head may be made of any material having the desired characteristics of hardness, toughness and resistance to fatigue, and may be secured to a stem of softer, more malleable metal.

Another object of the invention is to provide a drill head which may be readily attached to and detached from a drill shank.

Another object of the invention is to provide a drill head which may be cast with the desired cutting faces thereon and with a shank receiving bore formed therein, permitting the head to be formed of material difficult or impossible to machine.

Another object of the invention is to provide a drill head and means for attaching the same to a drill shank, in which danger of loosening of the head from the shank is minimized.

My invention will be described with reference to the accompanying drawing, wherein Figure 1 is an elevational view of a drill head and shank assembly constructed in accordance with my invention;

Figure 1:
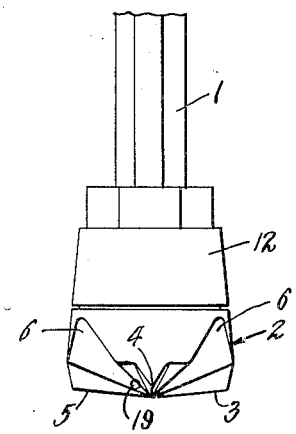
Figure 2:
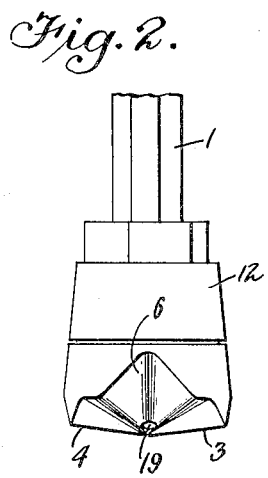
Figure 2 is an elevational view of the drill head and shank assembly shown in Figure 1, turned through 90°.

Referring to the drawing, I have illustrated in Figure 1 a drill shank 1, a cutting head 2, which may be formed separately from and attached to the drill shank 1.

The drill shank 1 is illustrated as being formed from a suitable length of relatively soft steel having any desired cross sectional configuration, that shown being octagonal.

The drill head 2 is illustrated as having a diameter considerably in excess of the diameter of the shank 1, the lower face of which is formed with a plurality of outwardly extending cutting edges 3, 4, 5, though it will be understood that any desired number of cutting edges may be provided upon the head. Each of the cutting edges is illustrated as constituting a V-shaped projection extending beyond the body of the drill head so that the point of the V constitutes an outermost extremity of the drill head.

Suitable clearance recesses 6 are formed between adjacent cutting edges to receive cuttings and chips of the material to be bored and permit them to escape without obstructing the advance of the cutting edge toward the rock or other material operated upon.

Figure 3:
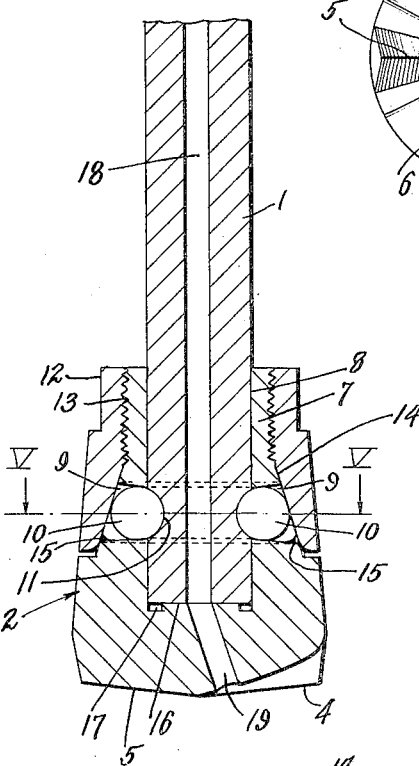
Figure 3 is a detail sectional view taken through the axis of the drill shank and head shown in Figure 1.
Figure 4:
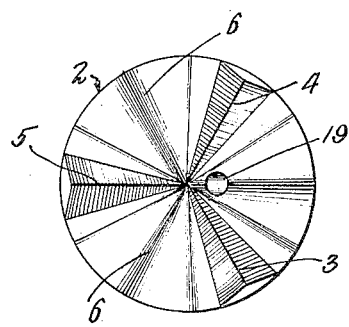
Figure 4 is an end view of the drill head shown in Figures 1 and 2.
Figure 5:
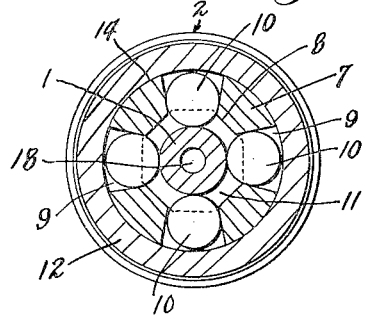
Figure 5 is a detail, sectional view, taken along line V—V of Figure 3.

By referring particularly to Figure 3, it will be observed that the drill head 2 is formed with an upwardly extending boss 7 through which extends a longitudinal bore 8 in which the end of the drill shank 1 may be received.

Preferably the bore 8 is provided with a cross sectional configuration conforming with the cross section of the shank 1, so that when the shank 1 is received within the bore the shank and the head are connected together against relative rotation.

The boss 7 of the head 2 is provided with a plurality of radially extending recesses 9, communicating between the bore 8 and the exterior of the boss to form seats within which may lie suitable connecting elements 10 interconnecting the head 2 with the shank 1. The radial recesses 9 are illustrated herein as tapering inwardly toward the bore 8, while the connecting elements 10 are illustrated as being steel balls having a diameter slightly in excess of the inner diameter of the recess 9 so that the balls 10 may be pressed through the recesses a sufficient distance to permit the surface of the ball to project into the bore 8.

The shank 1 is illustrated as having an annular recess 11 extending therearound, the cross section of the recess constituting slightly less than a semicircle, the curvature of which is substantially equal to the curvature of the periphery of the balls 10 so that when the balls 10 are pressed into the bore they will seat snugly against the shank 1 with a substantial area of the ball 10 contacting the shank material.

For the purpose of retaining the balls 10 in engagement with the recess 11, a collar 12 may be threaded upon the upper end of the boss 7, as by means of suitable threads 13, the interior of the lower part of the collar 12 being illustrated as having an outwardly extending taper to engage a complementary taper formed upon the side of the boss 7 so that by screwing the collar 12 down toward the head 2, the tapered surface 14 will press the balls 10 inwardly toward the shank 1.

When the collar 12 is removed from the head 2, the balls 10 may move outwardly away from the shank 1 and suitable limiting means may be provided in the recesses 9 to prevent the balls from falling completely out of the recess. Such means may comprise a projecting tip of metal 15 struck up from or welded to the material of the head.

It will be observed that the lower end of the bore 8 terminates in a flat shoulder recess 16 against which the end of the shank 1 may bear to transmit forces exerted longitudinally of the shank which will be transmitted directly to the head 2. If desired, the end of the bore 8 may be undercut, as is illustrated at 17, to provide clearance for any burs which may be formed upon the end of the shank 1 so that solid contact tween the shank and the head may be achieved.

As is usual in the construction of drills of this character, the shank 1 is provided with a central longitudinal bore 18 through which suitable flushing fluids or lubricating fluids may be passed to the head of the drill.

I have illustrated a fluid bore 19 as extending substantially longitudinally through the head 2 into communication with the bore 18 in the shank 1 so that flushing or lubricating fluids which may be employed will pass directly from the fluid bore 18 in the shank to the outermost part of the drill head 2.

From the foregoing description it will be observed that the head 2 may be readily attached to the shank 1 by loosening the collar 12, permitting the balls 10 to move outwardly in their recesses sufficiently to permit the drill shank to pass therebetween into abutment with the end of the bore 8. Then the collar 12 may be tightened to engage the ball stems and press them inwardly into tight seating engagement in the recess 11. When it is desired to detach the drill head, the reverse of the foregoing operations may be performed, and it will be observed that it is not necessary that the collar 12 be entirely removed from the head 2 in order to permit removal of the head from the shank so that the entire head assembly may be retained assembled at all times, and yet may be readily attached to and detached from the shank 1.

It will be observed that the formation of the drill head 2 is such as to readily permit the construction thereof entirely by a casting process so that the drill head may be cast with the cutting edges, the shank-receiving bore, the fluid bore, the recesses 9 and the threads 13 all formed therein. This construction permits the employment of any desired hard, tough metal in the formation of the head 2, entirely independent of the material which may be employed for the shank 1. Thus, for example, the head 2 may be formed of such hard unworkable material as tungsten-carbide, alloys, and similar materials which cannot be machined but which, due to their hardness and toughness, are particularly desirable as cutting elements. The drill shank which is employed may be made of any softer material, as may be the collar 12.

It will also be observed that when the drill head is in place upon the shank it is held in solid, tight engagement therewith so that the entire force of the blow upon the shank 1 is transmitted directly to the head 2. Moreover, by employing the tapered surface between the boss of the head 2 and the interior of the collar 12, a tight engagement between these elements may be attained, thus reducing the possibility of removal of the head from the drill stem.

In practice, it may occur that the drill head may become chipped or broken and upon such occurrence it is unnecessary to remove the entire drill stem from operation, since all that is necessary is to withdraw the stem and head from the bore, replace the broken or chipped head with a new head and the drilling operations may be resumed. Again the character of the material from which the head may be formed may be such as to resist fatigue, and since substantially little or no fatigue will occur in the drill stem, due to the fact that the shocks are absorbed primarily by the drill head, a single drill stem may be employed for use with a succession of drill heads.

In view of the fact that the drill head may be formed by the casting process, broken or chipped drill heads may be remelted and recast into perfect heads with no substantial loss of material.

While I have illustrated and described the preferred embodiment of my invention, I do not desire to be limited to any of the details of construction shown or described herein, except as defined in the appended claims.

I claim:

1. A cutting drillhead including a body member formed with a cutting face at one end thereof and having a longitudinal bore extending partially through said body member from the end opposite said cutting face to receive the end of a drill shank, the exterior side wall of the body member tapering inwardly toward said opposite end, a plurality of radial recesses extending from the exterior of said tapered wall into communication with said bore, a plurality of connecting devices in said recesses having a dimension in a direction radial to said bore greater than the radial length of said recesses, and a collar movable longitudinally of said body member and surrounding said tapered wall for engaging said connecting members to press them inwardly of said bore.

2. A cutting drillhead including a body member formed with a cutting face at one end thereof and having a longitudinal bore extending partially through said body member from the end opposite said cutting face to receive the end of a drill shank, the exterior side wall of the body member tapering inwardly toward said opposite end, a plurality of radial recesses extending from the exterior of said tapered wall into communication with said bore, a plurality of balls, one for each of said recesses having a diameter greater than the radial length of the recesses, a collar surrounding the tapered wall of said bore and movable longitudinally of said head for engaging said balls and pressing the same into said bore.

3. A cutting drill head including a body member formed with a cutting face at one end thereof and having a longitudinal bore extending partially through said body member from the end opposite said cutting face to receive the end of a drill shank, the exterior side wall of the body member tapering inwardly toward said opposite end, a plurality of radial recesses extending from the exterior of said tapered wall into communication with said bore, a plurality of balls, one for each of said recesses having a diameter greater than the radial length of the recesses, a collar surrounding said tapered surface and having a corresponding tapered interior surface movable longitudinally relative to said body member to engage said balls and press them inwardly of said bore.

4. A cutting drill head including a body member formed with a cutting face at one end thereof and having a longitudinal bore extending partially through said body member from the end opposite said cutting face to receive the end of a drill shank, the exterior side wall of the body member tapering inwardly toward said opposite end, a plurality of radial recesses extending from the exterior of said tapered wall into communication with said bore, a plurality of connecting devices in said recesses having a dimension in a direction radial to said bore greater than the radial length of said recesses, a collar movable longitudinally of said body member and surrounding said tapered wall for engaging said connecting members to press them inwardly of said bore, and a drill shank receivable in said bore and having an annular recess therein aligned with said radial recesses to receive said connecting members.

5. A cutting drill head including a body member having a cutting face formed upon one end thereof and having a longitudinal bore extending partially through said body member from the other end thereof, the exterior side wall of said body member surrounding said bore being threaded adjacent said other end and having an outwardly tapered surface extending beyond the threaded portion thereof, a plurality of radial recesses extending from the exterior of said tapered surface into communication with said bore, a plurality of balls, one in each of said recesses, each having a diameter greater than the radial length of said recesses, and a collar readily received upon said body member and having an inner tapered surface corresponding to the taper of the side wall of said body member to engage said balls and press the same inwardly of said bore.

KARL STROBEL.